(12) United States Patent
Hadzizukic et al.

(10) Patent No.: US 6,727,467 B1
(45) Date of Patent: Apr. 27, 2004

(54) HEATED HANDLE AND METHOD OF FORMING SAME

(75) Inventors: Ogden Hadzizukic, Windsor (CA); Gabriella Z. Almasi, Windsor (CA); Corina Alionte, Windsor (CA)

(73) Assignee: W.E.T. Automotive Systems AG, Oldezhausen (DE)

( * ) Notice: Subject to any disclaimer, the term of this patent is extended or adjusted under 35 U.S.C. 154(b) by 0 days.

(21) Appl. No.: 10/356,067

(22) Filed: Jan. 31, 2003

(51) Int. Cl.[7] .................................................. B60L 1/02
(52) U.S. Cl. .......................................... 219/204; 74/552
(58) Field of Search ................................ 219/204, 544, 219/545, 535; 74/552

(56) References Cited

U.S. PATENT DOCUMENTS

| | | | | |
|---|---|---|---|---|
| 3,747,036 A | * | 7/1973 | Erdmann | 336/84 R |
| 4,631,976 A | * | 12/1986 | Noda et al. | 74/552 |
| 5,714,738 A | * | 2/1998 | Hauschulz et al. | 219/535 |
| 6,111,233 A | * | 8/2000 | Rock et al. | 219/545 |
| 6,294,770 B1 | * | 9/2001 | Hasegawa et al. | 219/544 |
| 6,441,344 B1 | * | 8/2002 | Bonn et al. | 219/204 |
| 6,536,303 B2 | * | 3/2003 | Fransioli et al. | 74/552 |

FOREIGN PATENT DOCUMENTS

JP   20201020044   *   1/2001   ........... C22C/38/00

* cited by examiner

Primary Examiner—Ehud Gartenberg
Assistant Examiner—L. Fastovsky
(74) Attorney, Agent, or Firm—Dobrusin & Thennisch PC

(57) ABSTRACT

A heated handle (e.g. a steering wheel) is provided for an article of manufacture such as an automotive vehicle along with a method for forming the handle. The handle typically includes a core, an outer cover layer and a heater, which is preferably disposed at least partially between the outer cover layer and the core. The heater typically includes one or more of a conductor, a cushion and a separator.

22 Claims, 3 Drawing Sheets

HEATED HANDLE AND METHOD OF FORMING SAME

FIELD OF THE INVENTION

The present invention relates generally to heated handles and more particularly to heated steering handles (e.g., steering wheels) for use in automotive vehicles.

BACKGROUND OF THE INVENTION

For many years, industry has been concerned with designing improved handles for use in transportation vehicles or elsewhere and has been particularly concerned with designing improved steering wheels for automotive vehicles. As examples, U.S. Pat. Nos. 6,172,342, 6,093,908 are directed toward advancements in designs for steering wheels of automotive vehicles. In the interest of continuing such innovation, the present invention provides a heatable handle, which may be suitable for various transportation vehicles or other uses, but which has found particular utility as a heatable steering wheel for an automotive vehicle.

SUMMARY OF THE INVENTION

According to the present invention, there is disclosed a handle, which may be used for steering a transportation vehicle. The handle typically includes a heater and the heater is preferably positioned at least partially between a core and an outer covering of the handle. The heater typically includes one or more of a cushion, a separator, and a conductor and the conductor is preferably disposed at least partially between the cushion and the separator. In a preferred embodiment, the core is relatively rigid and is at least partially covered with a synthetic covering and has a substantially circular configuration. Optionally the core is designed to include one or more stress concentrators or relievers for controlled deformation in the even to extreme load conditions. Also in the preferred embodiment, the outer covering is formed of a grippable synthetic material such as leather, wood, metal, carbon fiber or a combination thereof and substantially entirely covers the core. The cushion is preferably provided as a layer of foamed or unfoamed plastic material, and more preferably one having at least one elastomer. The separator is preferably provided as a woven or unwoven fabric layer that is substantially coextensive with the cushion. The conductor is preferably at least partially between the cushion and the separator.

BRIEF DESCRIPTION OF THE DRAWINGS

The features and inventive aspects of the present invention will become more apparent upon reading the following detailed description, claims and drawings, of which the following is a brief description:

DETAILED DESCRIPTION OF THE INVENTION

The present invention is predicated upon providing an improved steering handle. It is contemplated that the handle may be employed in a variety of transportation vehicles including, without limitation, busses, boats, trains, tractors, motorcycles, airplanes, bicycles or the like. It is also contemplated that the heated handle may be employed in a variety of other environments such as within buildings, outdoors or the like. As an example, the heated handle may be configured as a grip for articles such as ski poles, walkers, hand tools or the like. As other examples, the heated handle may be configured as a stair or other railing, a door handle or the like. It has been found, however, that the handle is particularly effective when configured as a steering wheel of an automotive vehicle.

According to one aspect of the invention, the handle includes an improved heater for warming the handle. The improved heater, the handle or both may provide one or more of a variety of advantages in construction, durability, performance, assembly or the like. As one example, the heater may be formed of materials that allow the heater to be easily assembled as part of the handle. As another example, a more efficient method of formation of the heater may be employed according to the present invention. Other advantages of the present invention will become apparent from the following description.

Figure 1:
FIG. 1 is a perspective view of an internal portion of an automotive vehicle having an exemplary steering handle in accordance with the present invention.
Figure 2:
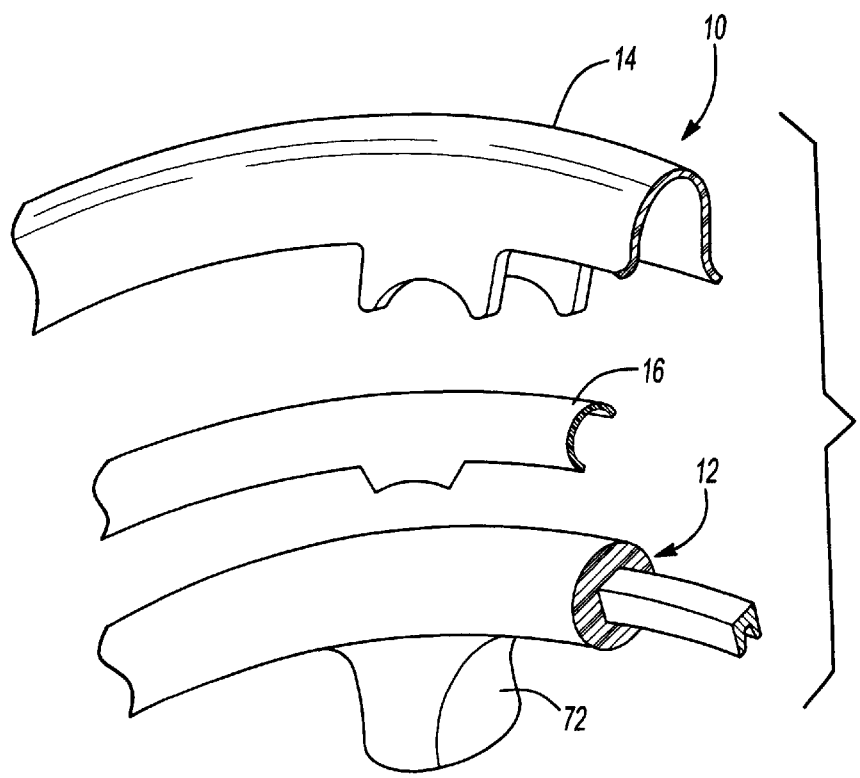
FIG. 2 is an exploded perspective view of the exemplary steering handle of FIG. 1.

Referring to FIGS. 1 and 2, there is illustrated a handle, and more particularly, a steering handle 10 in accordance with an aspect of the present invention. The steering handle 10 is illustrated in a preferred configuration (i.e., as a steering wheel of an automotive vehicle). It shall be understood, however, that a handle according to the present invention may be formed in a variety of configurations.

Typically, the handle 10 includes a core 12 an outer covering 14 and a heater 16 that is preferably positioned substantially between the core 12 and the covering 14 although not necessarily required. The heater 16 is generally composed of at least one thermal conductor, and may include additional components, such as a component for attaching the heater to the core, a component for providing a cushion, a separator, combinations thereof or the like.

Figure 3:
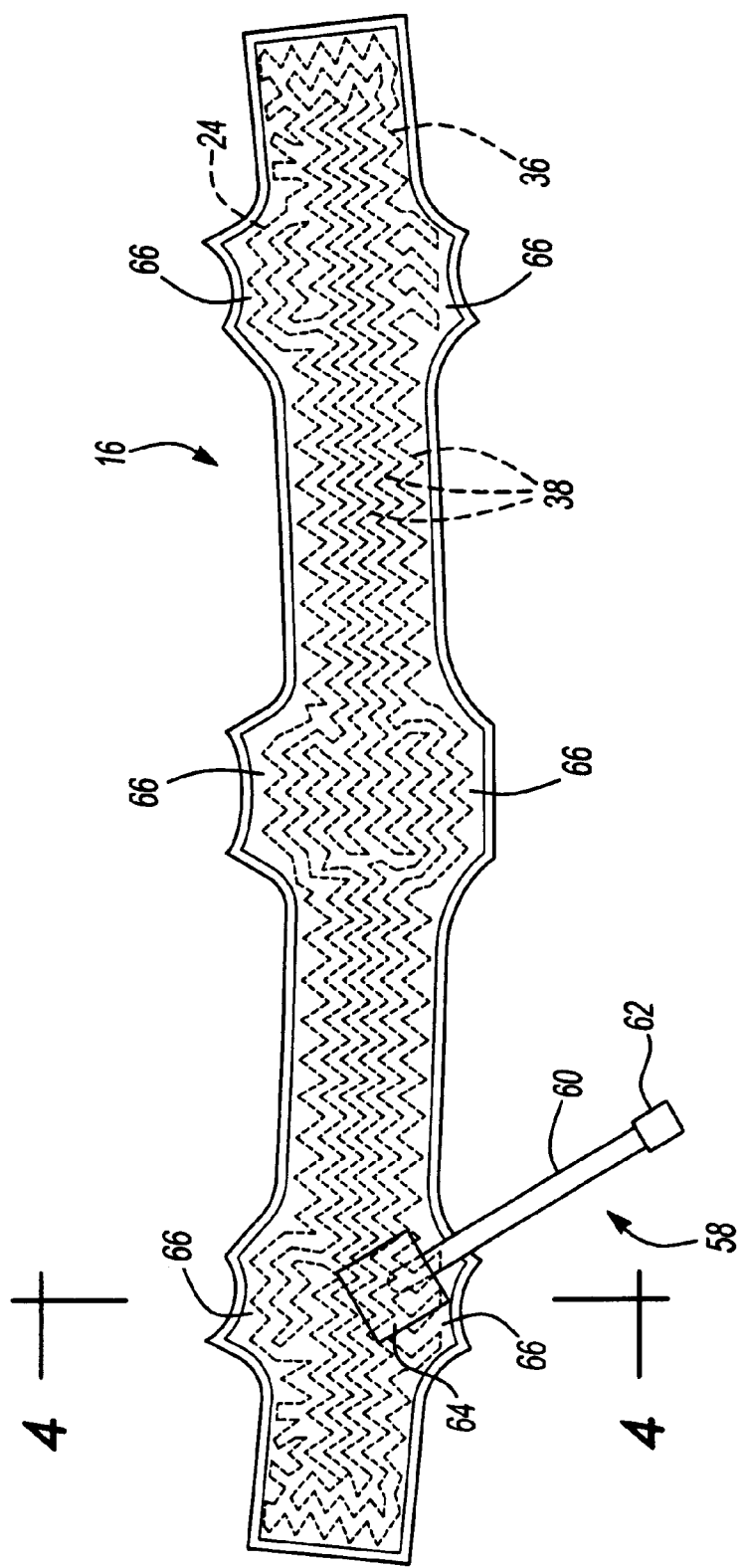
FIG. 3 is an elevational view of an exemplary heater in accordance with the present invention.
Figure 4:
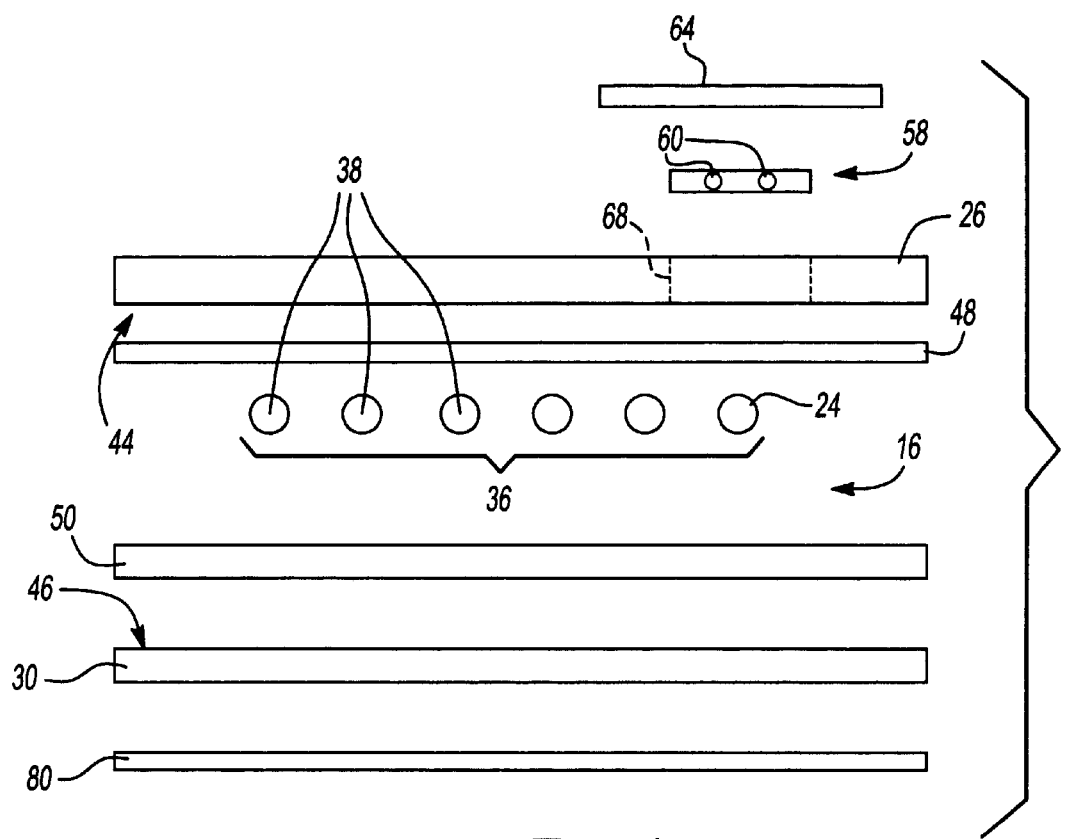
FIG. 4 is an exploded sectional view of the exemplary heater of FIG. 3 taken along line 4—4.
Figure 5:
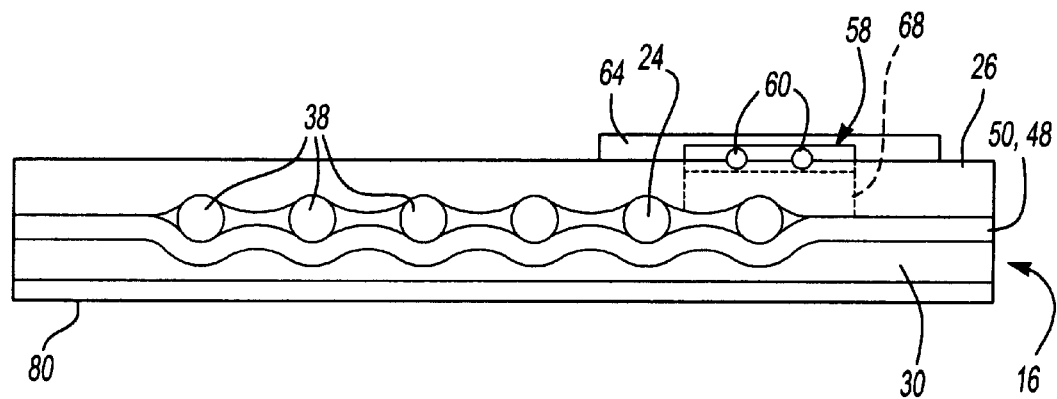
FIG. 5 is a sectional assembled view of the exemplary heater of FIG. 3 taken along line 4—4.

Referring to FIGS. 3–5, one preferred exemplary heater 16 is illustrated according to the present invention. The heater 16 includes a conductor 24, a cushion 26 and a separator 30. In the exemplary embodiment illustrated, the conductor 24, the cushion 26, and the separator 30 are each illustrated as layers, which are laminated together. In the preferred embodiment, the conductor 24 is positioned substantially entirely between the separator 30 and the cushion 26, however, in alternative embodiments, the conductor 24 may be partially or fully outside of one or both of the separator 30 and the cushion 26.

The conductor 24 may be comprised of one singular continuous conductive element or a plurality of conductive elements. The conductor 24 may also be comprised of one singular continuous conductive element that is divided into a plurality of conductive zones. Additionally, the conductive element[s] of the conductor layer 24 may be provided in several configurations such as one or more wires, strips, tapes, bands, combinations thereof or the like. In the particular embodiment illustrated, the conductor 24 includes one singular continuous conductive element 36 divided into three conductive zones 38 (e.g., circuits) and the conductive element 36 is formed of a plurality (e.g., about 3 to about 9, more preferably about 5 to about 7) of copper wire strands, which may be woven together. Preferably the strands each have a diameter between about 0.004 mm or less and about 0.02 mm or greater, more preferably between about 0.007 mm and about 0.011 mm and still more preferably between about 0.008 mm and about 0.009 mm.

It is contemplated that the conductor 24 may be partially or completely formed of several different conductive materials such as metals, conductive polymers, polymers with conductive dispersions, fluidic materials, combinations thereof or the like. In the preferred embodiment, the conductive element[s] 36 are formed of copper, nickel or combinations thereof. For example, the conductive element [s] can include up to 15% by weight nickel or greater and preferably is an alloy that includes between about 0.01% and about 13% by weight nickel and more preferably includes between about 0.1% and about 11% by weight nickel and even more preferably includes between about 1% and about 10% (e.g., about 2%) by weight nickel. It is also preferable for the conductive element to exhibit a resistance between about 0.01 Ω/m or less to about 5.0 Ω/m or greater, more preferably about 0.7 Ω/m to about 4.0 Ω/m and still more preferably about 1.5 Ω/m to about 2.5 Ω/m.

The cushion 26 may be provided in a variety of shapes and configurations. As examples, the cushion 26 may be flat, contoured, cylindrical, geometric, continuous, non-continuous, combinations thereof or the like. Alternatively, the cushion 26 may be located in only select locations of the handle 10 the heater 16 or both. In the depicted embodiment, the cushion 26 is illustrated a substantially continuous layer or elongated strip having a substantially uniform thickness.

Many various materials may form part or all of the cushion 26. Exemplary materials include fabrics, rubbers, foams, polymeric materials such as elastomers and plastomers, spunfibers, gels, air bladders, combinations thereof or the like. In the preferred embodiment illustrated, the cushion 26 is provided as an extruded, molded, cut, or otherwise formed layer of polymeric foam. The skilled artisan will recognize that a myriad of polymeric foams may be employed in the present invention. Examples of particularly preferred materials for the cushion 26 include foams that include or are formed of elastomer (e.g., neoprene), polyurethane, polyvinylchloride, polyol combinations thereof or the like. In one particularly preferred embodiment, the cushion 26 is formed of a flexible, stretchable, compressed polyurethane foam sold under Product Number: A300135 and commercially available from Foamex International Inc., 1000 Columbia Avenue, Linwood, Pa. 19061.

The material for the cushion is one that preferably has an elongation characteristic permitting it to be deformed (i.e., elongated) at least about 10%, more preferably about 25%, even more preferably about 50% and still more preferably about 75% of its own length prior to failure (e.g., rupture). Moreover, the material for the cushion is generally an insulator material that has a heat transfer coefficient between about 0.001 W/mK or lower and about 0.500 W/mK or higher, more preferably between about 0.005 W/mK and about 0.200 W/mK, and even more preferably between about 0.010 W/mK and about 0.100 W/mK. The thickness of the cushion is preferably between about 0.5 mm or less to about 3 mm or greater and more preferably between about 1 mm and about 2 mm.

The separator 30 may be formed in several shapes, sizes and configurations. For example, the separator may be continuous or intermittent, may have variable or substantially continuous thickness or may be otherwise configured as desired for a chosen application. Preferably, for the heater 16 shown, the separator 30 is configured to be substantially coextensive with the cushion 26. In FIGS. 3–5, the separator 30 is provided as a layer (e.g., an elongated strip) that substantially mirrors the cushion 26.

It is contemplated that the separator 30 may be formed of any of the potential materials suitable for the cushion 26 and the cushion 26 and the separator 30 may be formed of the same or different materials. In preferred embodiments, the separator 30 is formed of a fabric material, a fibrous material, a woven material, an unwoven material, a flock, a roving, combinations thereof or the like. Exemplary preferred materials include gauze, fleece, felt or the like. In one highly preferred embodiment, the separator is provided as a layer that is flexible, stretchable or both.

A highly preferred separator is a fleece formed of polymeric materials such as polyester, polyobfin (e.g. polypropylene), polyamide combinations thereof or the like. Moreover, the preferred material has an elongation characteristic permitting it to be deformed (e.g., stretched or elongated) at least about 10%, more preferably about 25%, even more preferably about 50% and still more preferably about 75% of its own length prior to failure (e.g., rupture). Additionally, the material for the separator preferably has a heat transfer coefficient between about 0.01 W/mK or lower and about 4.00 W/mK or higher, more preferably between about 0.1 W/mK and about 2.00 W/mK, and even more preferably between about 0.5 W/mK and about 1.00 W/mK. Preferably, the heat transfer coefficient of the separator 30 is higher than the heat transfer coefficient of the cushion 26. As an example, one particularly preferred material for the separator 30 is a polyester/polypropylene/polyamide fleece material sold as part number: 10660 or article number: EA-1111-A and commercially available from TWE Vliesstoffwerke Gmblt & Co., Hollefeldstrasse 46, 48282 Emsdetten, Germany.

To assemble the heater 16, it is contemplated that two or more of the cushion 26, the conductor 24 and the separator 30 may be configured in any order or position relative to each other. Preferably, however, the conductor 24 is arranged in a lay-wire configuration between the cushion 26 and the separator 30, all three of which are laminated in layers to each other.

It is contemplated that assembly of the heater 16 includes attaching any two or more of the conductor 24, the cushion 26, and the separator 30 to each other with one or more fasteners (e.g., adhesives, mechanical fasteners or the like). Alternatively or additionally, the conductor 24, the cushion 26, and the separator 30 may self-attach or self-adhere to each other. It is also contemplated that the conductor 24, the cushion 26, and the separator 30 may be mechanically self-attached to each other (e.g., woven together) or may be self-adhered to each other by softening or melting one of the conductor 24, the cushion 26, and the separator 30 such that it can wet and adhere to another of the conductor 24, the cushion 26, and the separator 30 Alternatively, surface ingredients of the conductor 24, the cushion 26 or the separator 30 may be activated to interact and bond the components together.

In the preferred embodiment, the cushion 26, the separator 30 or both are respectively provided with first surface 44, 46 and adhesive components 48, 50 (e.g., supplied as a layer, powder or otherwise) laminated, dispersed or otherwise placed on one, but preferably both of the first surfaces 44. 46. The conductive element 36 is pre-arranged in its desired pattern (e.g., by patterning the element about retractable posts). Thereafter, the conductive element 36 is arranged (e.g., lain) upon and/or attached (e.g., adhered) to one or both of the first surfaces 44, 46 of the cushion 26, the separator 30, the adhesive components 48, 50 or a combination thereof. Optionally, the conductive element 36, the adhesive components 48, 50, the cushion 26, the separator 30 or a combination thereof may be heated and pressed to assist in attaching the conductive elements 36 to one or more of these components. It is contemplated that the conductive element may be attached to the cushion 26 or separator 30 with the adhesive components 48, 50 and/or additional fasteners (e.g., tape or the like).

As shown, the zones 38 of the conductive element 36 extend generally parallel to each other in a zig-zag configuration. Also according to the preferred embodiment, the separator 30 is attached (e.g., adhered) to the cushion 26, the conductor 24 or both. Although various methods of attachment may be employed, one preferred method includes hot laminating (e.g., with a belt laminator) the separator 30 to the cushion 26 with the adhesive components 48, 50 (e.g., supplied as a layer, powder or otherwise) and the conductor 24 positioned therebetween. One preferred adhesive component is a multipurpose monolayer adhesive film sold under the tradename Integral 899A commercially available from Dow Chemical Corporation, Midland, Mich.

An electrical connection (e.g., an electrical harness) is typically employed for electrically connecting the heater of the present invention and particularly the conductor of the heater to a power source (not shown) of the automotive vehicle. A wide variety of electrical connections may be adapted for use with the heater of the present invention.

In the illustrated embodiment, there is an electrical connection 58 that includes a plurality of conductors 60, a plug 62 for connecting to the power source of the vehicle and a patch 64 (e.g., a tape patch). For connecting the electrical connection 58 to the conductor 24, one or more openings (not shown) are formed in the cushion 26 such that the conductive element 36 can extend through the cushion 26 to the conductors 60 of the connection 58. The conductive element 36 may be attached to the conductors 60 of the connection 58 by crimping, soldering or other technique and the conductors 60 may be insulated with electrical tape, dielectric tubes (e.g., polymeric shrink tubes) or the like. Preferably, a portion of the conductive element 36 is folded over onto itself and twisted at the connection 58 for lowering localized resistance as the connection 58 thereby avoiding heat buildup. It is also preferable for an opening 68 to be provided in the cushion 26 the conductors 60 may be attached to the conductive element 36. Advantageously, the opening 68 can provide additional space for avoiding read through of the connection 58 upon installation of the heater. Once connected, the patch 64 is applied or adhered to the cushion 26, the connection 58 or both for assisting in securing the connection 58 in place.

It is contemplated that the shape of the heater 16 may be different depending upon the article to which the heater 16 is applied and other factors as well. For the embodiment illustrated wherein the heater 16 is to be applied within the steering handle 10, the heater 16 is formed as a layer of an elongated strip with a slight curvature along a length of the strip. The heater also includes a plurality of protrusions 66 spaced apart along the length of the strip. Preferably, the protrusions 66 correspond to spokes 72 of the steering handle 10. For shaping the heater 16, the components 24, 26, 30 may be supplied and assembled in their final desired shape or may be assembled followed by cutting (e.g., die cutting) or otherwise shaping the heater 16.

The heater of the present invention may be integrated with a handle or with another article of manufacture as a singular assembled unit or separately in components. Moreover, the heater may be attached to an article using various fasteners such as mechanical fasteners, adhesives or the like. Alternatively, portions of the heater may physically or mechanically attach to an article of manufacture or an article of manufacture may physically or mechanically attach to the heater.

The heater 16 in FIG. 2 is sandwiched between the outer covering 14 and the core 12 of the steering handle 10 for integrating the heater 16 with the handle 10. Although various materials such as wood, polymeric materials or the like may be used, the outer covering 14 is preferably formed of leather, which may be sewn to itself for attaching the covering 14 over the core 12 and the heater 16. In a preferred embodiment, a layer of two-way tape 80 is adhered (e.g., laminated) to the separator 30 of the heater 16 with release paper (not shown) and the tape 80 is also adhered to the covering 14 of the steering handle 10 for assisting in securing the heater 16 to the covering 14. Preferably, the tape is applied to the heater 16 prior to shaping of the heater 16, but may be applied thereafter. One exemplary two-way tape is sold under the tradename Duplotac 160 and is commercially available from Lohmann Technologies Corporation, 3000 Earhart Court, Suite 155, Hebran, Ky. 41048. Thereafter, the covering 14 and heater 16 are preferably attached together to the core 12 of the handle 10.

In an alternative preferred embodiment, the separator 30 may include an adhesive (e.g. an adhesive layer) on an outer surface 68 for assisting in securing the heater 16 to the covering 14. Preferably, the adhesive is covered with release paper until it is applied (e.g. adhered) to the covering 14. In both preferred embodiments, the separator 30 of the heater 16 is closer to the covering 14 than the cushion 26. It is contemplated, however, that the tape may be applied to the separator 30 and the separator 30 may be adhered closer to the core 12 than the cushion 26.

Advantageously, the separator 30, the cushion 26 or both, can assist in preventing the conductor 24 from reading through the covering 14. Additionally, the separator 30, the cushion 26 or both, (e.g., whichever is closest to the core 12) can assist in preventing heat loss to the core 12 of the handle 10. Moreover, the separator 30, the cushion 26 or both, (e.g., whichever is closest to the covering 14) can assist in allowing heat transfer to the covering 14 of the handle 10. It is further contemplated that the overall heater 16, once assembled, can stretch (i.e., elongate) at least about 5%, more preferably about 10%, even more preferably 15% and still more preferably about 20% of its own length prior to any significant damage or failure (e.g., rupture). Advantageously, when used, the zig-zag configuration of the conductive element 36 can assist in allowing the heater 16 to elongate when necessary.

It is also contemplated that a control unit and one or more temperature gauges may be employed with the heater of the present invention. Preferably, such a control unit is in signaling communication with the temperature gauges associated with the heater and the control unit controls the amount of electricity supplied to the heater based upon temperatures sensed by the temperature gauges. In a preferred embodiment, the control unit employs pulse width modulation for lowering any temperature fluctuations exhibited by the heater. Of course this is only one of many methods, which may be employed for maintaining or achieving a desired heat output from the heater.

Unless stated otherwise, dimensions and geometries of the various structures depicted herein are not intended to be restrictive of the invention, and other dimensions or geometries are possible. Plural structural components can be provided by a single integrated structure. Alternatively, a single integrated structure might be divided into separate plural components. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

The preferred embodiment of the present invention has been disclosed. A person of ordinary skill in the art would realize however, that certain modifications would come within the teachings of this invention. Therefore, the following claims should be studied to determine the true scope and content of the invention.

What is claimed is:

1. A handle, comprising:
   a core having a substantially rigid portion;
   an outer covering that at least partially covers the core;
   a heater disposed at least partially between the core and the outer covering, the heater including:
   i) a cushion configured as a layer;
   ii) a separator configured as a layer that is substantially coextensive with the cushion; and
   iii) a conductor at least partially between the cushion and the separator
   wherein the conductor includes three distinct zones, which form three separate circuits of a singular continuous conductive element and wherein a portion of the conductor is folded over on itself and twisted at a connection of the heater.

2. A handle as in claim 1, wherein the heater includes a plurality of protrusions corresponding to spokes of the handle.

3. A handle as in claim 1, wherein the conductor is in a lay-wire configuration between the cushion and the separator and the cushion is formed of a compressed polyurethane foam material.

4. A handle as in claim 3, wherein at least one zone of the three zones extends substantially parallel to another zone of the three zones.

5. A handle as in claim 3, wherein the conductor is at least partially formed of strands that are formed of a metal alloy of copper and between about 1% and about 10% nickel.

6. A handle as in claim 5, wherein the conductor includes about 5 to about 7 strands and a diameter of each of the strands is between about 0.007 mm and about 0.011 mm.

7. A handle as in claim 1, wherein the separator has a heat transfer coefficient between about 0.10 $W/m^2K$ and about 2.0 $W/m^2K$ and the cushion has a heat transfer coefficient between about 0.005 and about 0.2 $W/m^2K$.

8. A handle as in claim 7, wherein the cushion is closer to the core than the separator.

9. A steering handle for a transportation vehicle, comprising:
   a core formed of a rigid member that is at least partially covered with a polymeric material;
   an outer covering that substantially entirely covers the core;
   a heater disposed between the core and the outer covering, the heater including:
   i) a cushion, the cushion being provided as a layer of foamed polymeric material having at least one elastomer;
   ii) an separator, the separator being provided as a fabric layer that is substantially coextensive with the cushion; and
   iii) a conductor at least partially between the cushion and the separator
   wherein the heater can elongate about 15% of its own length prior to any significant damage and wherein the conductor includes three distinct zones, which form three separate circuits of a singular continuous conductive element and wherein a portion of the conductor is folded over on itself and twisted at a connection of the heater.

10. A handle as in claim 9, wherein the heater includes a plurality of protrusions corresponding to spokes of the handle.

11. A handle as in claim 9, wherein the conductor is in a lay-wire configuration between the cushion and the separator and the cushion is formed of a compressed polyurethane foam material.

12. A handle as in claim 9, wherein at least one zone of the three zones extends substantially parallel to another zone of the three zones.

13. A handle as in claim 9, wherein the conductor is at least partially formed of strands that are formed of a metal alloy of copper and between about 1% and about 10% nickel.

14. A handle as in claim 9, wherein the separator has a heat transfer coefficient between about 0.10 $W/m^2K$ and about 2.0 $W/m^2K$ and the cushion has a heat transfer coefficient between about 0.005 and about 0.2 $W/m^2K$.

15. A handle as in claim 9, wherein the cushion is closer to the core than the separator.

16. A handle as in claim 9, wherein the conductor includes about 5 to about 7 strands and a diameter of each of the strands is between about 0.007 mm and about 0.011 mm.

17. A steering wheel for an automotive vehicle, comprising:
   a core formed of a rigid member that is at least partially covered with a polymeric material, the core having a substantially circular configuration;
   an outer covering that substantially entirely covers the core, the outer covering being formed of leather;
   a heater disposed substantially entirely between the core and the outer covering, the heater including:
   i) a cushion, the cushion being provided as a layer of polymeric material having at least one elastomer wherein the cushion is formed of compressed polyurethane, the cushion has a heat transfer coefficient between about 0.005 and about 0.2 $W/m^2K$;
   ii) a separator, the separator being provided as a fleece layer that is substantially coextensive with the cushion, the separator being attached to the cushion with an adhesive wherein the separator has a heat transfer coefficient between about 0.10 $W/m^2K$ and about 2.0 $W/m^2K$; and
   iii) a conductor substantially entirely between the cushion and the separator, the conductor being formed of one singular continuous conductive element wherein the conductor is formed of a plurality of copper wire strands that are woven together, the conductor is separated into three distinct zones, which form three separate circuits that extend parallel to each other in a zig-zag configuration and the strands are formed of a metal alloy of copper and between about 1% and about 10% nickel;
   wherein the cushion is closer to the core than the separator and a portion of the conductor is folded over on itself and twisted at a connection of the heater.

18. A handle as in claim 1 wherein the heater can elongate about 15% of its own length prior to any significant damage.

19. A steering wheel as in claim 1 wherein the material for the cushion has an elongation characteristic permitting it to be elongated at least about 50% of its own length prior to failure.

20. A steering wheel as in claim 19 wherein the material for the separator has an elongation characteristic permitting it to be elongated at least about 50% of its own length prior to failure.

21. A steering wheel as in claim 17 wherein the material for the cushion has an elongation characteristic permitting it to be elongated at least about 50% of its own length prior to failure.

22. A steering wheel as in claim 21 wherein the material for the separator has an elongation characteristic permitting it to be elongated at least about 50% of its own length prior to failure.

* * * * *

UNITED STATES PATENT AND TRADEMARK OFFICE
CERTIFICATE OF CORRECTION

PATENT NO. : 6,727,467 B1  Page 1 of 1
DATED : April 27, 2004
INVENTOR(S) : Ogden Hadzizukic, et al.

It is certified that error appears in the above-identified patent and that said Letters Patent is hereby corrected as shown below:

<u>Title page,</u>
Item [56], References Cited,
Please add the following:
-- 4,535,221    8/1985      Holsworth
4,547,655    10/1985     Kurata et al.
4,640,340    2/1987      Noda et al.
5,072,093    12/1991     Scheuerer
5,294,775    3/1994      Carrier
5,605,643    2/1997      Reece
5,847,360    12/1998     Lorenzen et al.
6,093,908    7/2000      Haag
6,172,342    1/2001      Khafagy et al.
6,414,270    7/2002      Sugiyama et al.
DE 196 1 1 231 C1    7/1997 --.

Please add the following:
-- 6,093,910    7/2000      McClintock et al.
6,392,195    5/2002      Zhao et al.
6,495,799    12/2002     Pillsbury, IV et al. --.

Signed and Sealed this

Tenth Day of August, 2004

JON W. DUDAS
*Acting Director of the United States Patent and Trademark Office*